United States Patent [19]

Bowman et al.

[11] 4,140,047
[45] Feb. 20, 1979

[54] MOBILE CAB WITH AIR FILTER

[75] Inventors: Robert L. Bowman, Ephrata; Edwin O. Margerum, Paradise; Mark L. Cozine, East Earl, all of Pa.

[73] Assignee: Sperry Rand Corporation, New Holland, Pa.

[21] Appl. No.: 894,324

[22] Filed: Apr. 7, 1978

[51] Int. Cl.² ............................................. B60H 3/06
[52] U.S. Cl. .................................... 98/2.11; 55/480; 55/493; 55/385 B; 55/357; 98/2.15
[58] Field of Search ............... 55/385 B, 472, 478, 55/480, 493, 503, 357, 481, 506; 98/2.11, 2.14, 2.15

[56] References Cited

U.S. PATENT DOCUMENTS

| 1,445,732 | 2/1923 | Vonracek | 98/2.14 |
|---|---|---|---|
| 1,621,770 | 3/1927 | Eckland | 98/2.14 |
| 2,172,939 | 9/1939 | Lintern et al. | 98/2.14 |
| 3,393,498 | 7/1968 | Schoen | 55/493 |
| 3,593,503 | 7/1971 | Andrews | 55/493 |
| 3,844,202 | 10/1974 | Ferguson | 98/2.11 |
| 3,868,896 | 3/1975 | Doll et al. | 98/2.11 |
| 4,002,443 | 1/1977 | Lorenz | 55/422 |

*Primary Examiner*—Frank W. Lutter
*Assistant Examiner*—David L. Lacey
*Attorney, Agent, or Firm*—C. Hercus Just; Frank A. Seemar; John B. Mitchell

[57] ABSTRACT

Mobile vehicles and the like having enclosed cabs such as tractors, combines and the like, are provided with air inlet means for the comfort of the operator. The air inlet means are provided with a readily removable filter element and means to support the same by an overhanging forward portion of the roof which extends beyond the windshield of the cab. The filter element is supported by a frame and includes means to raise and lower the frame respectively to support the filter element in upper, operative position and lower, removable position, insertion and removal of the same occurring through an opening adjacent one side edge of the roof of the cab and normally closed by a door, the entire removal occurring exteriorly of the interior of the cab.

7 Claims, 4 Drawing Figures

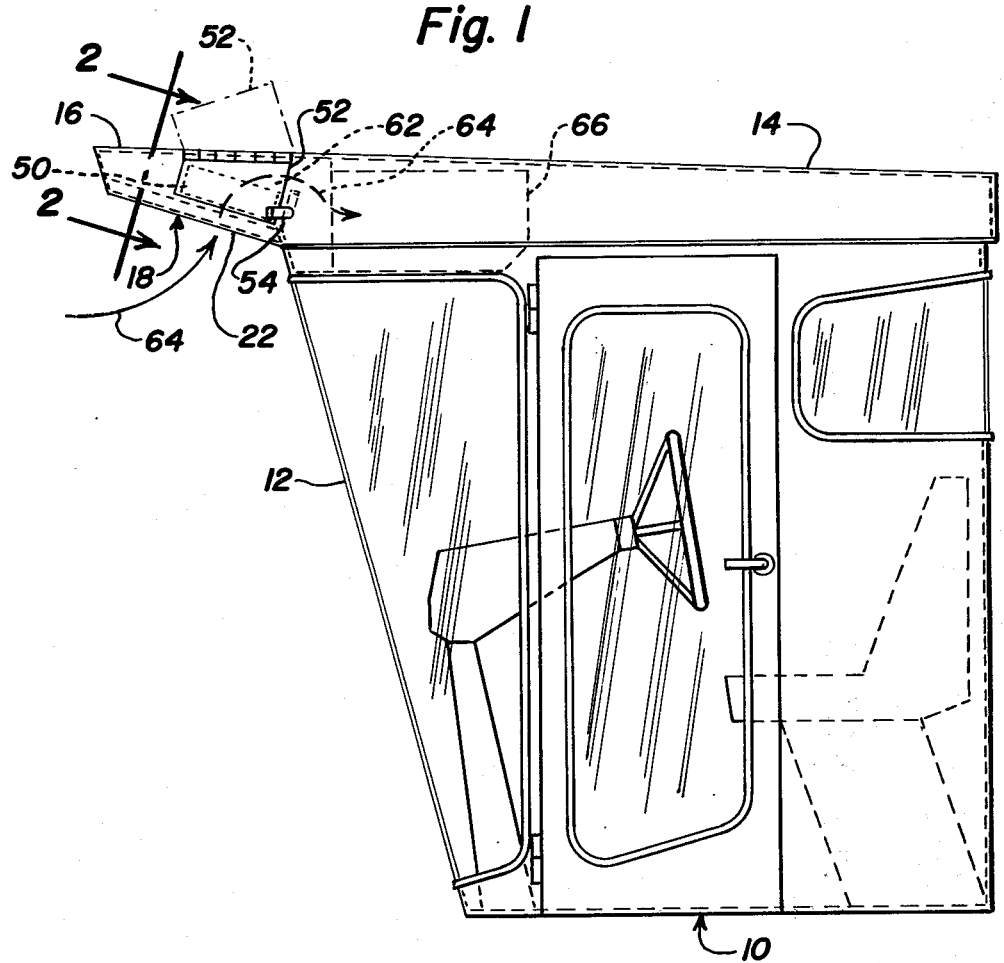
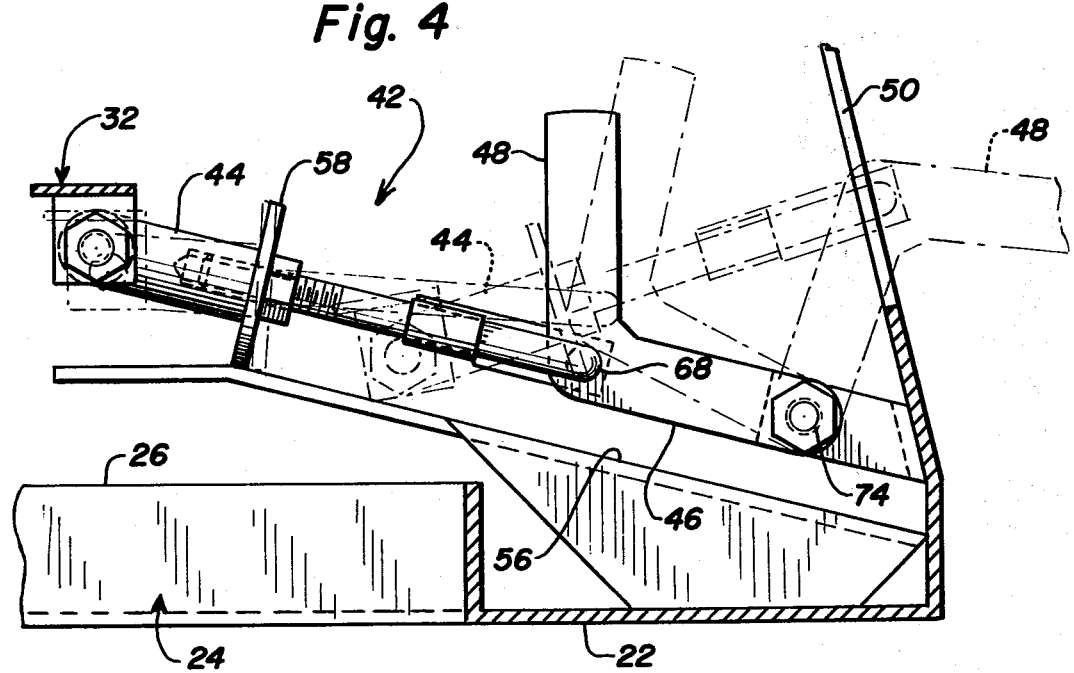

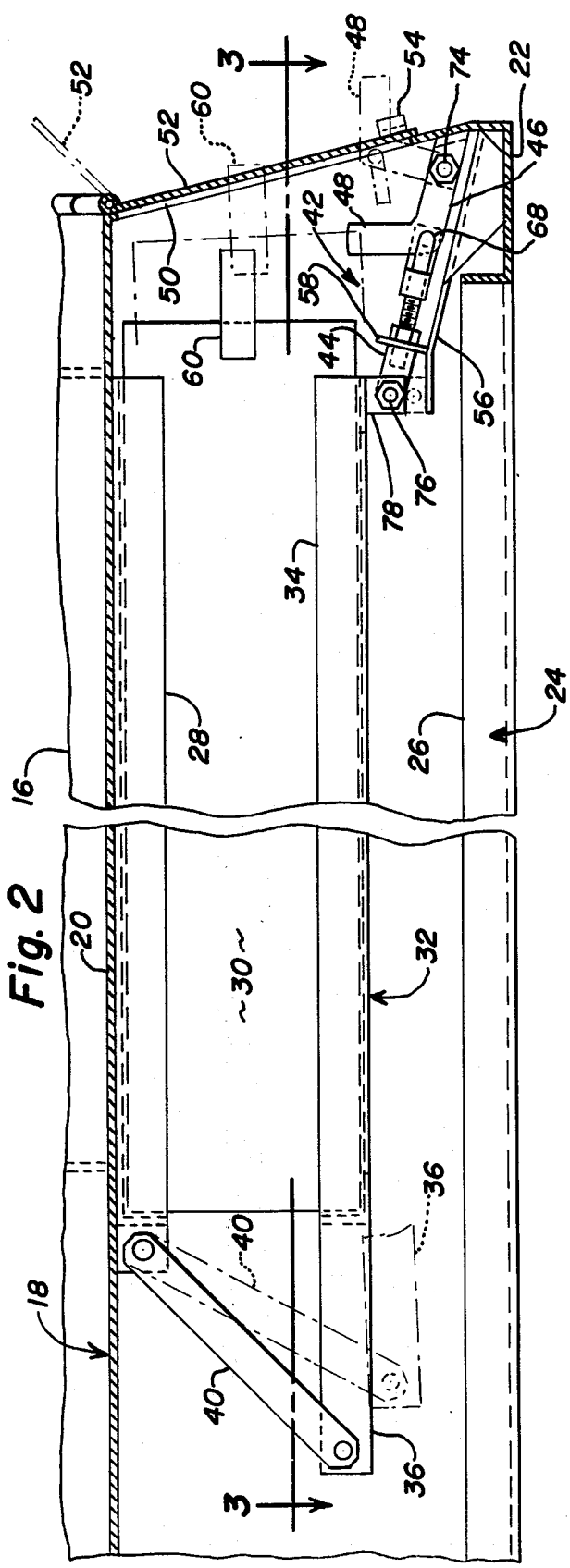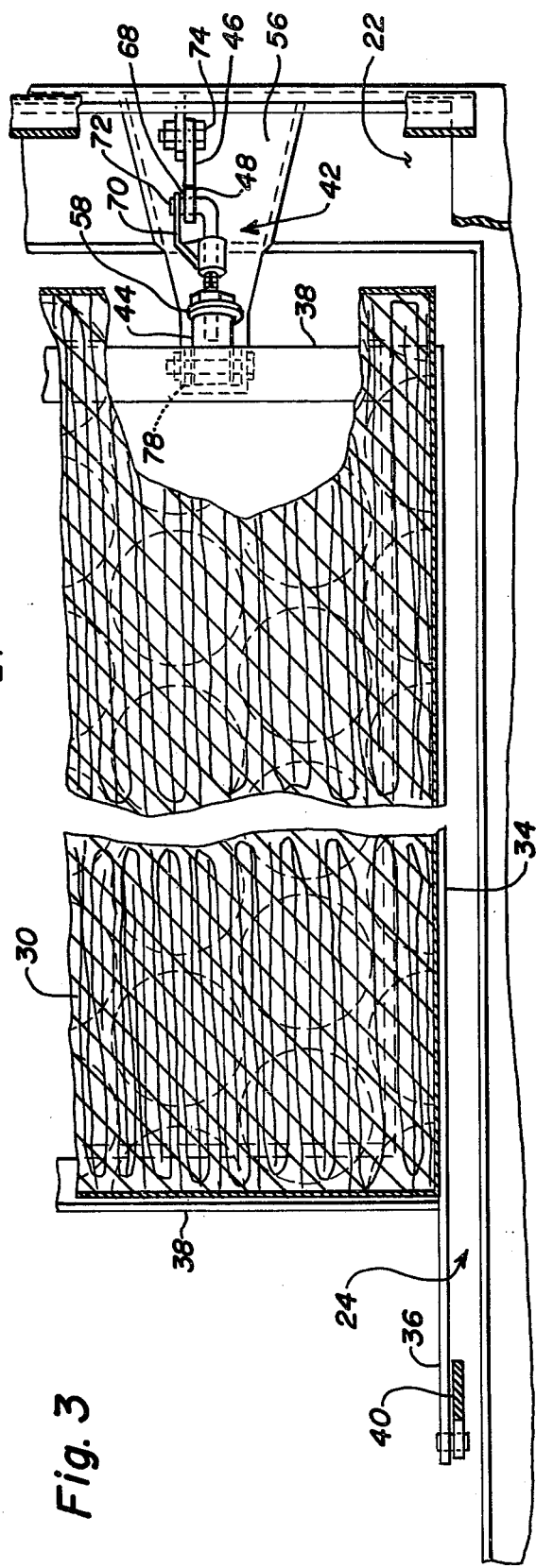

MOBILE CAB WITH AIR FILTER

BACKGROUND OF THE INVENTION

For a substantial period of time, various air inlet means have been provided in the cabs and bodies of vehicles of various kinds for purposes of providing comfort to the occupants. Usually, the air entrance opening was covered by a suitable screen to prevent the entrance of insects and other elements floating in the atmosphere which generally are larger than dust, whereby a screen mesh of reasonable size, such as insect screening, was adequate to prevent entrance of such items into the interior of the enclosed cab or body of the vehicle. Typical examples of the aforementioned protecting screens associated with the air entrance openings are illustrated in U.S. Pat. Nos. 1,445,732 to Vondracek, dated Feb. 20, 1923; 1,621,770 to Eckland, dated Mar. 22, 1927; and 2,172,939 to Lintern et al, dated Sept. 12, 1939.

Especially for use in dusty atmospheres such as harvest fields, as well as manufacturing plants where dust is preuelant, more refined means have been utilized to prevent the entrance of dust to an enclosed cab of the vehicle. For use with the cab of a combine, one example of such more refined filter means is shown in U.S. Pat. No. 3,844,202 to Ferguson, dated Oct. 29, 1974, in which a pair of upstanding tubes having inlet means at the upper ends, surrounded by cylindrical filter elements, are used to filter the entrance of air to the interior of the cab of a combine.

One further refined version of a filter element for the cab of a tractor, for example, is shown in U.S. Pat. No. 3,868,896 to Doll et al, dated Mar. 4, 1975, in which filter means are provided on the interior of a roof of a cab of a tractor, the air entering the cab through a block-type filter element which is supported over an inlet opening by clamping means, said inlet being exterior of the cab adjacent the rear window thereof, but when the filter is to be replaced or cleaned, the element which has dust and dirt adhering thereto and clogged in the pores thereof, must be removed into the interior of the cab, thereby permitting dust and dirt to fall into the interior and thus defeat some of the object of utilizing the filter.

The filter arrangement comprising the present invention is arranged so that the entire filter, including means to remove and replace the same, are exterior of the cab under all circumstances and are relatively simple to construct and operate.

SUMMARY OF THE INVENTION

It is the principal object of the present invention to provide filter mechanism comprising a housing supported by a forward extension of the roof of the cab of a vehicle, such as a tractor, combine or the like, said housing being forwardly of the windshield of the cab and having an air inlet opening extending transversely across the front of the cab and disposed lowermost in the housing, and also including means to movably support a filter element capable of preventing the passage of dust and other larger sizes of extraneous material therethrough, the filter element being supported directly above the air inlet opening of the housing and in the path of air moving through said inlet opening to the interior of the cab by means of an air discharge opening in the housing connected to the cab, the filter element being insertable into said housing and removable therefrom through a door in one end of the housing which is immediately adjacent one side edge of the roof of the cab, the opening normally being closed by a hinged door.

It is another object of the invention to support the filter element with one surface communicating with the air discharge means from said housing and the opposite surface being disposed immediately above the air inlet opening of the housing but in spaced relationship thereto when the filter element is in operative position, the filter system including a substantially rectangular frame at least equal in area to the air inlet opening of the housing and adapted to support the edges of the filter element which preferably is rigid, the means supporting said frame permitting downward movement of the same to lower the filter element a limited distance from the operative position thereof and thereby unclamp the filter element for removal through said opening in the housing as aforesaid.

A further object of the invention is to support said frame by simple means comprising linkage one end of the frame and movably supported by the housing, said linkage means in the operative position thereof being disposed at a predetermined angle to the vertical and, when the frame is to be lowered, the linkage is moved in a direction to dispose it to at least a lesser angle to the vertical, and thereby lower one end of said frame, while the opposite end of the frame is supported by means engageable with a ramp that extends downward and outward and also comprises means to operate the linkage as aforesaid.

Still another object of the invention is to provide the linkage arrangement which engages said aforementioned ramp in the form of a toggle arrangement comprising a pair of pivoted links, and one of the links has a manually engageable handle thereon by which pivotal movement of the links is effected in a manner to cause the end of the frame operated thereby to descend and thereby cooperate with the other linkage means in moving the frame to a lower, inoperative position relative to which the filter element may be removed through said opening in one end of said housing.

Another highly effective object of the invention is to arrange the filter element immediately above the air inlet opening within which the element is enclosed so that accumulated dust and other material adhering to the lower face of the filter element is in position to fall through said air inlet opening to the outside atmosphere and in no way be passed to the interior of the cab, said arrangement being such that vibration of the cab, such as when opening and closing the cab door, will induce some of the accumulated material to fall therefrom through said air inlet opening and, moreover, even when the filter is being removed through the side opening in the housing for replacement or cleaning, there is no possibility of the dust accumulated on the filter entering the cab.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a side elevation of an exemplary cab showing in the forward extension of the roof, air filter means embodying principals of the present invention.

FIG. 2 is a fragmentary vertical sectional view on a larger scale than FIG. 1, showing details of the filter mechanism as seen on the line 2—2 of FIG. 1.

FIG. 3 is a fragmentary plan sectional view taken on the line 3—3 of FIG. 2.

FIG. 4 is a fragmentary partial vertical sectional elevation, illustrating on a larger scale than in FIGS. 2 and 3, details of the filter support mechanism disposed at the right-hand end of FIGS. 2 and 3.

DETAILED DESCRIPTION

Referring to FIG. 1, an exemplary cab 10 is shown, having a conventional upwardly and forwardly sloping front windshield 12 and the roof 14 provided with a forward sunshield extension 16 which projects beyond the upper end of the front windshield 12.

Referring to FIGS. 2 and 3, a housing 18 extends transversely across the roof or sunshield extension 16 between opposite sides thereof, said housing comprising a top wall 20 which, if desired, may comprise part of the roof 14, and a lower wall 22 in which an elongated, preferably rectangular opening 24 is provided, the same being surrounded by an upwardly extending flange 26 to reenforce the opening. The top wall 20 also supports flanged angles 28, of which a pair of the same are provided in parallel relationship and spaced apart for purposes of receiving the upper surface of a rectangular, block-like filter element 30 which is relatively rigid, while the lower portion of the filter element 30 is engaged and supported by a frame 32, conveniently formed from angle members 34 which are substantially coextensive in length with the filter element 30, and one end 36 of the angle members 34 projects beyond the filter element 30 as best shown in FIGS. 2 and 3. Transverse angle members 38 also extend between the angle members 34 and are rigidly connected thereto to comprise the lower frame 32 which cooperates with the upper frame comprising flanged angles 28 to clamp therebetween the filter element 30 by means described hereinafter.

The left-hand end of the lower frame 32 as viewed in FIGS. 2 and 3 is supported by a pair of pivotal links 40 which, in the upper, clamping position of the lower frame 32, are disposed substantially at a 45° angle to the vertical, the opposite ends thereof respectively being pivoted to the flanged angles 28 and extensions 36 of frame 32, whereby when the lower frame 32 is moved horizontally toward the right, as viewed in FIGS. 2 and 3, the links 40 will be disposed in the phantom position shown in FIG. 2, which they are at a lesser angle to the vertical than in the full line position thereof, thereby lowering the frame to the exemplary fragmentary phantom position shown in FIG. 2, it being understood that in the lower position, the lower frame 32 will be substantially parallel to the upper flanged angles 28 with which the lower frame cooperates to clamp the filter in operative position, as described above.

The right-hand end of the housing 18, as viewed in FIGS. 2 and 3, also contains support means for the opposite end of the lower frame 32, said support means being in the form of a toggle unit 42, including a pair of pivotally connected links 44 and 46, link 44 being longitudinally adjustable by threaded means clearly illustrated in FIGS. 2 and 3. Link 46 comprises a pair of rigidly connected angularly related arms, the arm 48 thereof comprising a handle extending upwardly for access through an opening 50 in one end of the housing 18, said opening normally being closed by a hinged door 52, the opening being for purposes of readily inserting and removing the filter element 30 to and from its operative position with respect to the upper and lower clamping means 28 and 32. The door 52 has an appropriate handle 54 thereon to manipulate the same.

Also provided in the right-hand end of the housing 18 for coaction with the toggle unit 42 is an inwardly and upwardly sloping ramp 56, which is engageable slidably by a washer 58 or other appropriate projection on the link 48 for purposes of lowering the right-hand end of the lower frame 32 when the arm 48 of link 46 is pivotally moved clockwise, such as to the phantom position thereof, shown in FIG. 2. Such pivotal movement of the link 46 not only lowers the right-hand end of frame 32, but also pulls the frame to the right, as viewed in FIGS. 2 and 3, thus causing the link 44 and especially the washer 58 to descend the ramp 56 to effect such lowering movement.

When the frame 32 is in the lower position thereof, the filter element 30 is unclamped from between the upper frame 28 and lower frame 32 and readily may be slidably moved through the opening 50, such removal being facilitated by employing a handle 60, or other similar manipulating means on the adjacent end of the filter 30. Correspondingly, after the filter has been cleaned, either that cleaned filter, or a new one, readily is inserted in operative position by moving the same through the opening 50 for positioning between the upper frame means 28 and lower frame 32, following which the toggle link 46 is manipulated by arm 48 to move it from the phantom position to the full line position and thus place the filter in operative position against the upper frame member 28 for communication with an air discharge opening 62 in housing 18 which communicates with the interior of the cab, whereby the directional arrows 64 in FIG. 1 indicate the path of air upward through the air inlet opening 24 of the housing 18, through the filter, and then into said interior of the cab. There is illustrated diagrammatically in FIG. 1, an exemplary air conditioning unit 66, which receives the filtered air and chills the same for discharge into the interior of the cab 10.

It has been found advantageous, especially under rough field conditions, to modify the structure of the toggle unit 42, shown in FIG. 4, by providing a locking feature. More specifically, the filter is "locked" into position if pivot point 68 has a home position below the line between bolts 76 and 74.

There are a number of advantages included in the filter and the support means therefor as described above. Not the least of these is the relative simplicity of the supporting means for the filter unit 30, but very importantly, it will be seen that the filter unit 30, in the operative position thereof, is directly above the rectangular opening 24 in the lower wall 22 of housing 18. Hence, any dust or other extraneous material which has collected along the lower surface thereof is in position to fall from the filter through the opening 24, which is forwardly of the windshield 12 of the cab 10 and therefore, exterior of the cab. Similarly, incident to removing the filter element 30 from its operative position after lowering the frame 32 and exiting the same through opening 50 in the end of the housing adjacent one side edge of the roof 14, any material which falls from the filter also will either fall through the opening 24 or otherwise to the exterior of the cab 10 and thereby not contaminate the interior thereof.

For simplicity of construction and to prevent the lateral extension of the link 44, which is pivoted at 68 to link 46, a suitable means such as a cantilever lock lever 70 of a spring nature or otherwise, engages the outer end 72 of that portion of articulated link 44 which extends through the pivot opening in link 46. The adjustable length of the link 44 is accomplished by conventional means clearly shown in FIGS. 2 and 3 without describing details thereof. Link 46 also is pivoted by bolt 74 to a suitable ear fixed to the lower wall 22 of the housing and, correspondingly, the link 44 is pivotally connected by another bolt 76 or the like to a bracket 78 connected to one end of lower frame 32.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

We claim:

1. A mobile vehicle having an enclosed cab including a front window and a roof having an extension thereon directed forwardly a limited distance from said window above the same and having opposed sides in combination with a housing connected to said roof extension for support thereby forwardly of said window and having an exposed wall extending substantially between the sides of said roof extension and provided with an elongated air inlet opening therein of appreciable length extending transversely between said sides of said roof extension and forwardly of said window, an air discharge opening in said housing being in flow communication with the interior of said cab, an air filter element substantially coextensive in area with said air inlet opening, a frame supporting said filter element above said air inlet opening, means supporting said frame for movement between an upper operative position for said filter element and a lower position for removal of said filter element, an access opening in one end of said housing adjacent one side of said roof extension and in alignment with one end of said frame and through which said filter element can be inserted and removed, and means operable to move said frame as aforesaid.

2. The vehicle and cab according to claim 1 in which said means movably supporting said frame comprising linkage means adjacent opposite ends of said frame connected movably to said frame and said housing.

3. The vehicle and cab according to claim 2 in which the linkage means at one end of said frame extends at an angle to the vertical in operative position and movable to at least a lesser angle to the vertical to move said end of said frame to said lower position thereof and the linkage means for the opposite end of said frame is a toggle arrangement.

4. The vehicle and cab according to claim 3 in which said housing includes an outwardly and downwardly sloping surface interengageable with said opposite end of said frame to effect movement of said end to said lower position thereof.

5. The vehicle and cab according to claim 4 in which said toggle arrangement includes a pair of links each having one end pivoted together and the opposite ends of said links respectively being pivotally connected to said opposite end of said frame and said housing adjacent said access opening.

6. The vehicle and cab according to claim 5 in which one of said links of said toggle arrangement has a manually engageable handle thereon comprising said means to move said frame as aforesaid, said handle being accessible through said access opening.

7. The vehicle and cab according to claim 1 further including flange means depending from the upper part of said housing and operable to position th upper portion of said filter element operatively when said frame is in the upper operative positon thereof.

* * * * *